UNITED STATES PATENT OFFICE.

SAMUEL F. WOODHOUSE, OF PHILADELPHIA, PENNSYLVANIA.

WOOD-FILLER.

SPECIFICATION forming part of Letters Patent No. 318,935, dated May 26, 1885.

Application filed March 17, 1885. (No specimens.)

*To all whom it may concern:*

Be it known that I, SAMUEL F. WOODHOUSE, a citizen of the United States, residing in the city and county of Philadelphia, State of Pennsylvania, have invented a new and useful Improvement in Filling for Wood, which improvement is fully set forth in the following specification.

In order to carry out my invention I take four pounds of china-clay, four pounds of corn-starch, four pints of linseed-oil, four pints of turpentine, four pints of hard oil finish or varnish, and one pint of japan-drier; but the proportions may be varied as desired. The clay and starch are mixed with the oil, and the turpentine, varnish, and drier then added thereto, and the whole ground together, thus producing a transparent liquid, which, owing to its nature, may be applied with a brush, which is of great advantage and will not rub off; hence is durable and reliable.

Another advantage of the filling as produced is, that in its application to the wood it does not require rubbing off by rags, &c., and will not turn white or discolor the lightest woods, nor crack and peel, and will be found a good substitute for shellac.

Having thus described my invention, what I claim as new, and desire to secure by Letters Patent, is—

A composition of matter forming a filling for wood, consisting of china-clay, corn-starch, linseed-oil, turpentine, varnish, and japan-drier, the said materials being combined in the proportion and manner substantially as described.

SAML. F. WOODHOUSE.

Witnesses:
JOHN A. WIEDERSHEIM,
A. P. GRANT.